(12) United States Patent
Powell et al.

(10) Patent No.: US 11,381,789 B2
(45) Date of Patent: Jul. 5, 2022

(54) PARTIAL PIXEL BINNING FOR CIS

(71) Applicant: SHENZHEN GOODIX TECHNOLOGY CO., LTD., Shenzhen (CN)

(72) Inventors: Matthew Powell, San Diego, CA (US); Scott D Willingham, San Diego, CA (US)

(73) Assignee: Shenzhen Goodix Technology Co., Ltd., Shenzhen (CN)

(*) Notice: Subject to any disclaimer, the term of this patent is extended or adjusted under 35 U.S.C. 154(b) by 97 days.

(21) Appl. No.: 16/914,369

(22) Filed: Jun. 28, 2020

(65) Prior Publication Data
US 2021/0409659 A1 Dec. 30, 2021

(51) Int. Cl.
H04N 9/04 (2006.01)
H04N 5/335 (2011.01)
H04N 5/3745 (2011.01)
H04N 5/347 (2011.01)
H04N 5/355 (2011.01)
H04N 5/378 (2011.01)

(52) U.S. Cl.
CPC ......... H04N 9/04557 (2018.08); H04N 5/347 (2013.01); H04N 5/35536 (2013.01); H04N 5/378 (2013.01)

(58) Field of Classification Search
None
See application file for complete search history.

(56) References Cited

U.S. PATENT DOCUMENTS

| 2014/0027613 | A1 | 1/2014 | Smith |
| 2014/0192250 | A1 | 7/2014 | Mitsunaga |
| 2016/0248956 | A1* | 8/2016 | Mitsunaga ........... H04N 5/2355 |
| 2019/0305018 | A1* | 10/2019 | Price ................. H04N 5/35563 |

FOREIGN PATENT DOCUMENTS

CN   207910897   9/2018

* cited by examiner

Primary Examiner — Mark T Monk
(74) Attorney, Agent, or Firm — Kilpatrick Townsend & Stockton LLP

(57) ABSTRACT

An image sensor includes a pixel array comprising a plurality of pixels, a color filter array comprising a plurality of color filter clusters overlying the pixel array, and readout circuitry configured to concurrently provide the pixels sharing the common filter cluster and having a first exposure time to a readout line for digital data conversion. Each of the color filter clusters includes a group of same color filters, and pixels sharing a common color filter cluster have different exposure times.

10 Claims, 9 Drawing Sheets

PARTIAL PIXEL BINNING FOR CIS

TECHNICAL FIELD

The present invention relates to image sensor devices, and more particularly, to image sensors with fast readout, high dynamic range, and low readout noise.

BACKGROUND

Modern image sensors with high pixel count attempt to achieve high frame rate, low read noise and high dynamic range with minimal power consumption. The basic function of a modern CMOS image sensor (CIS) is to capture photons that are converted into electrons in a photodiode array. These captured electrons are read out by a series of ADCs included as part of the image sensor. The frame rate is determined by the number of ADCs used, the number of total pixels to read out and the time to read out one pixel on one ADC. Increasing the number of ADCs or reducing the time to read out one pixel generally increase the total power consumed by the image sensor.

BRIEF SUMMARY OF THE INVENTION

Embodiments of the present invention provide novel technical solutions for faster readout and lower readout noise for the same power consumption of a conventional CIS. Exemplary embodiments of the inventive concept utilize novel pixel binning schemes. The inventive concept is relevant in image sensors where multiple photodiodes shared a same readout structure.

In one aspect of the present invention, an image sensor includes a pixel array comprising a plurality of pixels, a color filter array comprising a plurality of color filter clusters overlying the pixel array, and readout circuitry configured to concurrently provide the pixels sharing the common filter cluster and having a first exposure time to a readout line for digital data conversion. Each of the color filter clusters includes a group of same color filters, and pixels sharing a common color filter cluster have different exposure times.

In another aspect of the present invention, an image sensor includes a pixel array comprising a plurality of pixels, a color filter array comprising a plurality of color filter clusters overlying the pixel array, and readout circuitry configured to concurrently provide pixel signals of half the respective number of pixels to a readout line at a first time interval for digital data conversion to obtain first respective digital data. Each of the color filter clusters includes a number of same color filters overlying a respective number of pixels.

In one embodiment, the readout circuitry is further configured to concurrently provide pixel signals of a remaining half the respective number of pixels to the readout line at a second time interval different from the first time interval for digital data conversion to obtain second respective digital data.

In one embodiment, the readout circuitry reads out the pixel signals of all of the pixels associated with a color filter cluster using a regular conversion gain by performing two read out operations to obtain a sqrt(2) improvement in readout noise.

In yet another aspect of the present invention, an image sensor may include a pixel array comprising a plurality of pixels, a color filter array comprising a plurality of filter clusters disposed over the pixel array, and readout circuitry configured to concurrently provide pixel signals of the respective first number of pixels or the respective second number of pixels to a readout line for digital data conversion to obtain first respective digital data in a same time interval, but not the pixels signals of the respective first number of pixels and the respective second number of pixels at the same time interval. Each of the filter clusters includes a first number of first filters overlying a respective first number of pixels and a second number of second filters overlying a respective second number of pixels, the first filters are different from the second filters.

In still another embodiment of the present invention, a method for binning pixels in an image sensor may include providing a first set of pixel signals of a first set of pixels in a color filter cluster having a first exposure time to a readout line by readout circuitry, converting the first set of pixel signals to first digital data, providing a second set of pixel signals of a second set of pixels in the color filter cluster having a second exposure time to the readout line by the readout circuitry, the second exposure time being different from the first exposure time, converting the second set of pixel signals to second digital data, and generating a high dynamic range composite pixel data value by scaling the second digital code by a ratio of the first and second exposure times and generating the composite pixel data value from the first and scaled second digital code through a suitable algorithm. In one embodiment, pixels having a first exposure time and pixels having a second exposure time are diagonally arranged in the first pixels set. By exposing pixels with different exposure times in a color filter cluster and binning pixels having a same exposure time in the color filter cluster and measuring the binned charge by a common ADC, a real time high dynamic range (HDR) can be achieved.

In one embodiment, a method includes providing a color filter array comprising a plurality of color filter clusters overlying a plurality of pixels. The color filter clusters each include a number of same color filters. The method also includes binning half the number of pixels in a color filter cluster and providing the binned half the number of pixels to a readout line in a first time interval for data conversion to obtain first digital data representative of the pixel signals associated with the half the number of pixels. The method further includes binning a remaining half the number of pixels in the color filter cluster and providing the binned remaining half the number of pixels to the readout line in a second time interval different from the first time interval for data conversion to obtain second digital data representative of the pixel signals associated with the remaining half of the number of pixels in the color filter cluster. The half the number of pixels in the color filter cluster may be horizontally binned or vertically binned. The method also includes combining the first digital data and second digital data to obtain digital data associated with the pixels of the color filter cluster. By binning half the number of pixels for performing two readouts using a conventional conversion gain, a reduction of readout noise is achieved.

In another embodiment, a method includes providing a pixel array having a plurality of pixels and providing a color filter array having a plurality of filter clusters overlying the pixel array. Each of the filter clusters includes a first number of first filters overlying a respective first number of pixels and a second number of second filters overlying a respective second number of pixels. The method also includes binning pixel signals of the first number of pixels or the second number of pixels in a filter cluster in a same time interval, but not both the first number of pixels and the second number of pixels in the filter cluster in the same time interval. The method further includes binning pixel signals of the first or second number of pixels that have not been binned for readout. In one embodiment, the color filter array may have a non-Bayer color pattern, the filter clusters may include color filters passing red, green, blue components, and luminance filters passing through white light.

Additional features and advantages will be apparent to those skilled in the art upon reading the following detailed description and the accompanying drawings.

BRIEF DESCRIPTION OF THE DRAWINGS

The accompanying drawings form a part of the present disclosure that describe exemplary embodiments of the present invention. The drawings together with the specification will explain the principles of the invention.

DETAILED DESCRIPTION OF THE INVENTION

Embodiments of the present invention provide novel technical solutions for faster readout and lower readout noise for the same power consumption of a conventional CIS. Exemplary embodiments of the inventive concept utilize novel pixel binning signals for readout. The inventive concept is relevant in image sensors where multiple photodiodes shared a same readout structure. It is common to have 2, 4 or 8 photodiodes sharing a common readout structure, though any number of pixels is in principle possible. The readout structure varies from image sensor to image sensor, but generally includes at least one reset device, one source follower device and one select device. The pixel binning concept is to provide the electron charge from all the photodiodes at one time on the shared floating diffusion node. In this case, the summation of all the shared pixels can be read out with one analog-to-digital (ADC) operation. This reduces the total energy to read out the entire array and reduces the circuit noise applied to the shared pixel cluster. The main disadvantage is a reduced optical resolution, which is considered an acceptable tradeoff in many scenarios. An additional mode of binned pixel readout occurs in eight shared photodiode cases where one 2×2 group has one color filter lens applied (e.g., Red) and the other 2×2 group has a second color filter lens applied (e.g., Green).

An inventive concept of the present disclosure introduces partial binning readout in more cases than just a 2×2 shared color pattern. This involves reading out a subset of pixels in a 2×2 or 2×4 pixel sharing scenario. Instead of reading out a set of shared pixels in just a single ADC read operation, two or more ADC read operations are now performed, but the number of ADC read operations are still fewer than if each pixel is read out individually. The present disclosure provide three exemplary embodiments for this type of operation, they are directed to real time high dynamic range (HDR), binned pixel readout without using dual conversion gain, and non-quad Bayer color schemes with pixel sharing.

Figure 1:
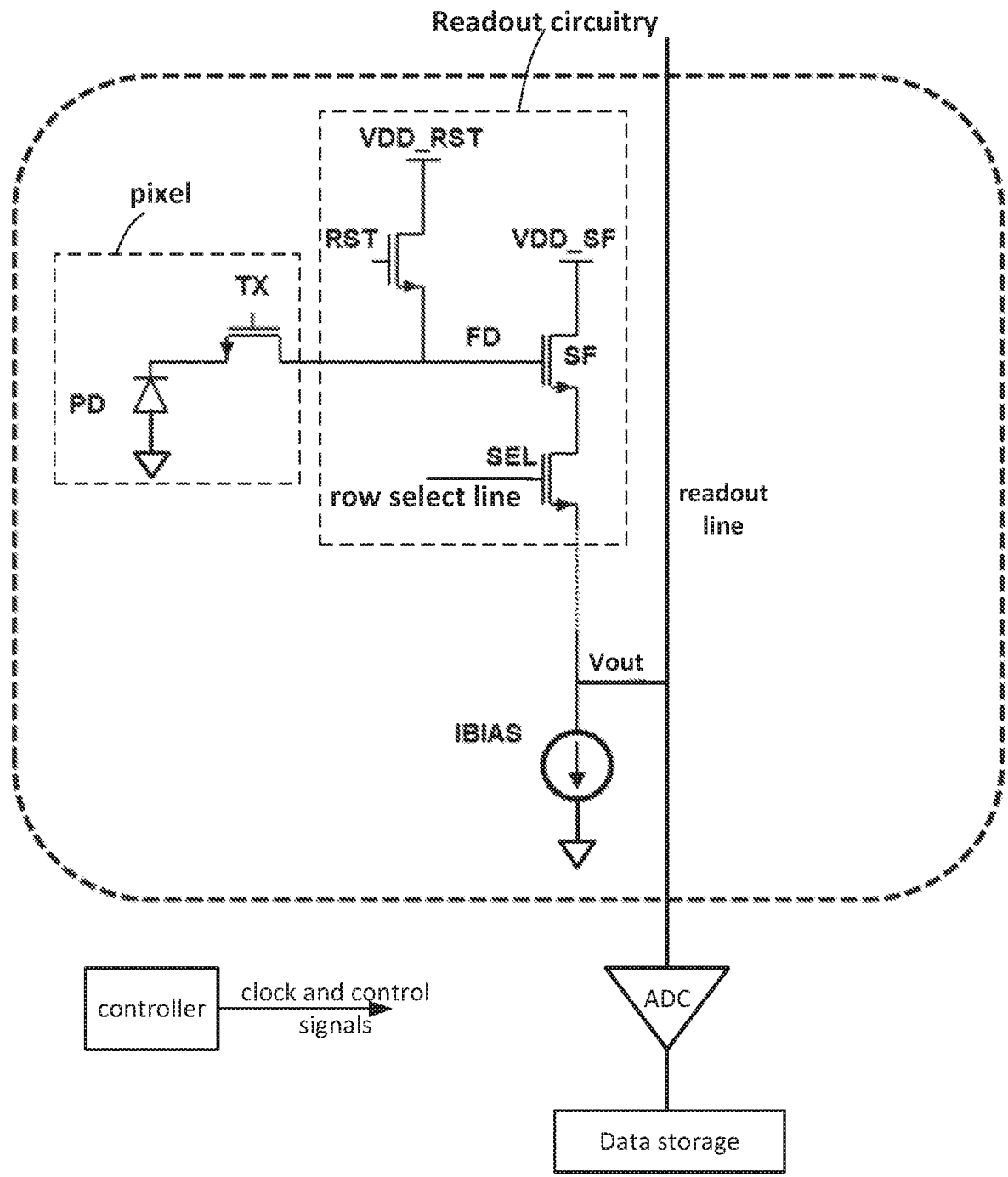
FIG. 1 is a schematic diagram illustrating a portion of an image sensor including a pixel and readout circuitry that may be used to explain the present disclosure.

FIG. 1 is a schematic diagram illustrating a portion of an image sensor including a pixel and readout circuitry that may be used to explain the present disclosure. Referring to FIG. 1, the pixel includes a photodiode (or a photosensitive element) PD, and a transfer transistor TX coupled to the photodiode PD. The readout circuitry includes a source follower SF having a gate coupled to the transfer transistor TX, a reset transistor RST coupled to a floating diffusion node FD disposed between the transfer transistor TX and the gate of the source follower SF. The reset transistor RST is configured to charge the floating diffusion node FD to the reset voltage VDD_RST when the reset transistor RST is turned on, thereby resetting the floating diffusion node FD. The photodiode PD may be reset along with the floating diffusion node FD by turning on the transfer transistor TX. The source follower SF has a terminal coupled to the source follower voltage VDD_SF and another terminal coupled to a select transistor SEL. The select transistor SEL has a gate coupled to a row select line and is disposed between the source follower SF and a voltage readout line that provides an analog output pixel signal VOUT to an analog-to-digital converter ADC. The select transistor SEL is coupled to a current source IBIAS. The analog output pixel signal VOUT is connected to the readout line and provided to the ADC for data conversion. In one embodiment, the transfer transistor TX, the reset transistor RST, the source follower SF, and the select transistor SEL are NMOS transistors. The image sensor may also include a controller configured to provide clock and control signals for the pixel, the readout circuitry and the ADC. The image sensor may also include a data storage configured to store digital data representative of the pixel signals.

Figure 2:
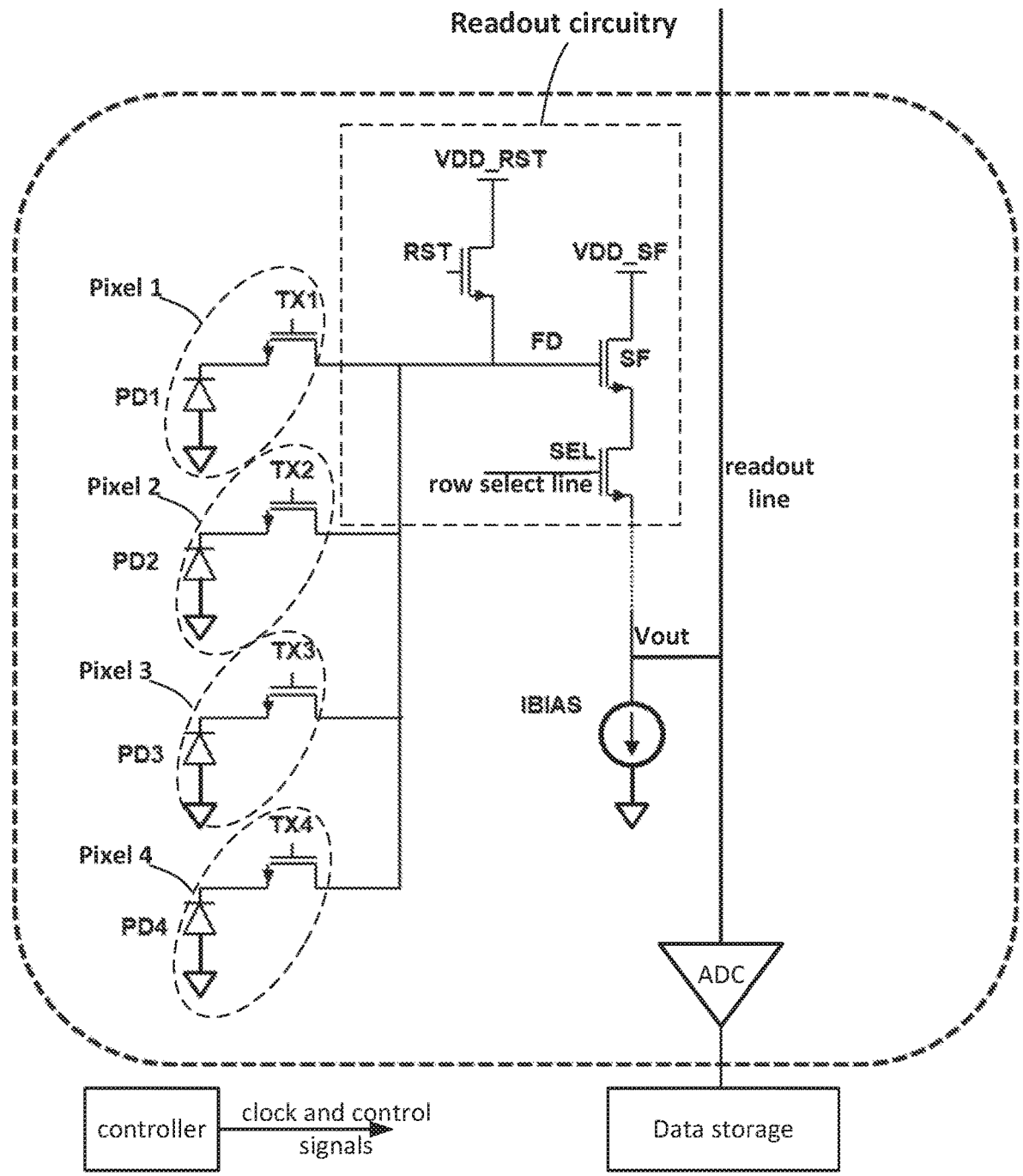
FIG. 2 is a schematic diagram illustrating a portion of an image sensor including four pixels and readout circuitry according to an embodiment of the present disclosure.

FIG. 2 is a schematic diagram illustrating a portion of an image sensor including four pixels and readout circuitry according to an embodiment of the present disclosure. Referring to FIG. 2, four pixels pixel 1, pixel 2, pixel 3, and pixel 4 in four different rows or in four different columns share a same floating diffusion node, the reset transistor RST, the source follower transistor SF, the select transistor SEL. The pixel on each row or each column has its own transfer transistor TX. In one embodiment, the four pixels are grouped in a pixel cluster, and a charge of each of the four pixels can be transferred individually or collectively to the floating diffusion node FD by activating respective transfer transistors TX1 through TX4. The charge level of floating diffusion node FD can be provided to the readout line and to the ADC for data conversion to obtain digital data, which is then stored in a data storage. Binning pixel signals, reading out and storing the digital data are controlled by a controller. In one embodiment, the controller may include processing circuitry, logic state machines, phase locked loops, and the like to provide clock and control signals to the image sensor.

Figure 3A:
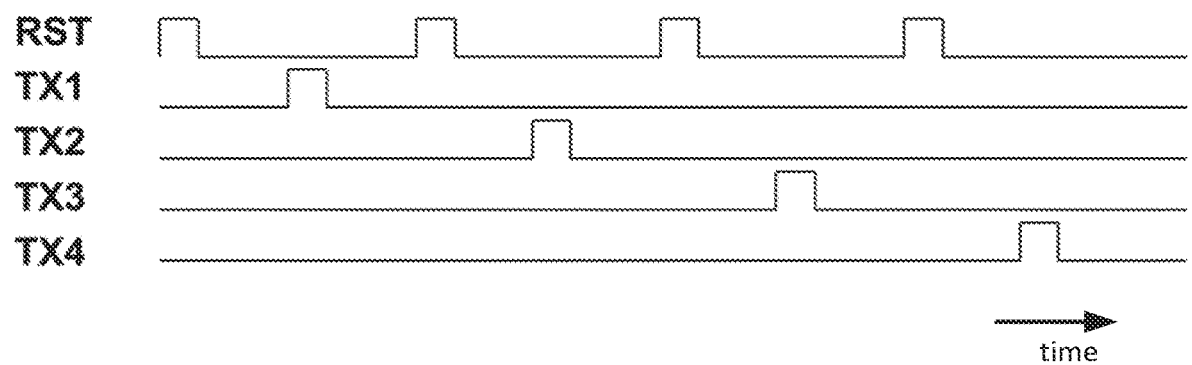
FIG. 3A is a timing diagram illustrating a readout cycle for reading out individual pixels of FIG. 2.

FIG. 3A is a timing diagram illustrating a readout cycle for reading out individual pixels of FIG. 2. Referring to FIG. 3A, pixel signals of pixels 1 through 4 are separately and individually provided to the readout line in a time sequential manner.

Figure 3B:
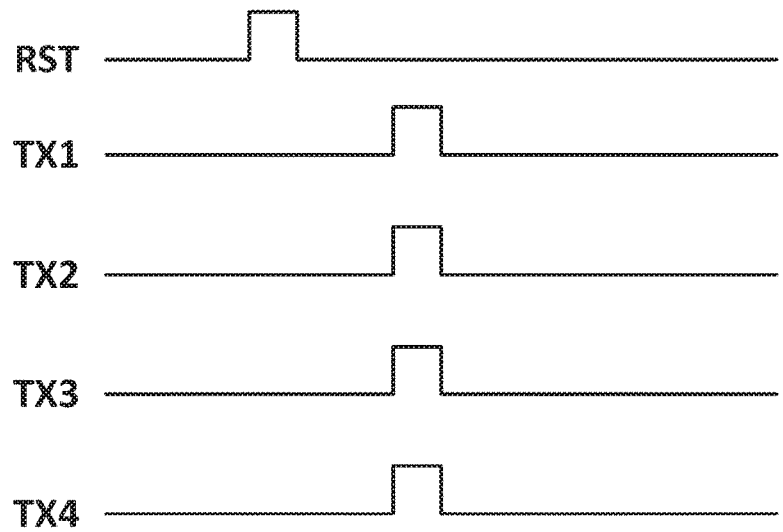
FIG. 3B is a timing diagram illustrating a readout cycle for reading out pixels of FIG. 2 in a conventional binning mode.

FIG. 3B is a timing diagram illustrating a readout cycle for reading out pixels of FIG. 2 in a conventional binning mode, where pixel signals of the pixels 1 through 4 are binned together and concurrently provided to the readout line for digital data conversion by an ADC.

Embodiment 1

This exemplary embodiment discloses an image sensor that provides real time HDR. In real time HDR, a group of 2×2 pixels share the same color, but are controlled with different exposure times which are overlapping. The purpose of this inventive concept is to achieve higher dynamic range. Long exposure times are able to accurately measure low light levels. Higher light levels which would saturate pixels with long exposure times are accurately measured with shorter exposure times. In this way, a greater dynamic range linear measurement of light intensity can be constructed for the 2×2 pixel location based on the composite read out. There may be 2, 3 or 4 different exposure times for this type of HDR. Normally this type of HDR is done by reading out all four pixels individually. But for pixels that have the same exposure time, there is little benefit to read them out individually. Instead, pixels having the same exposure time can be binned together for a common ADC measurement. In the basic case with two exposure times, this corresponds to two ADC measurements per 2×2 pixel instead of four exposure times.

Figure 4:
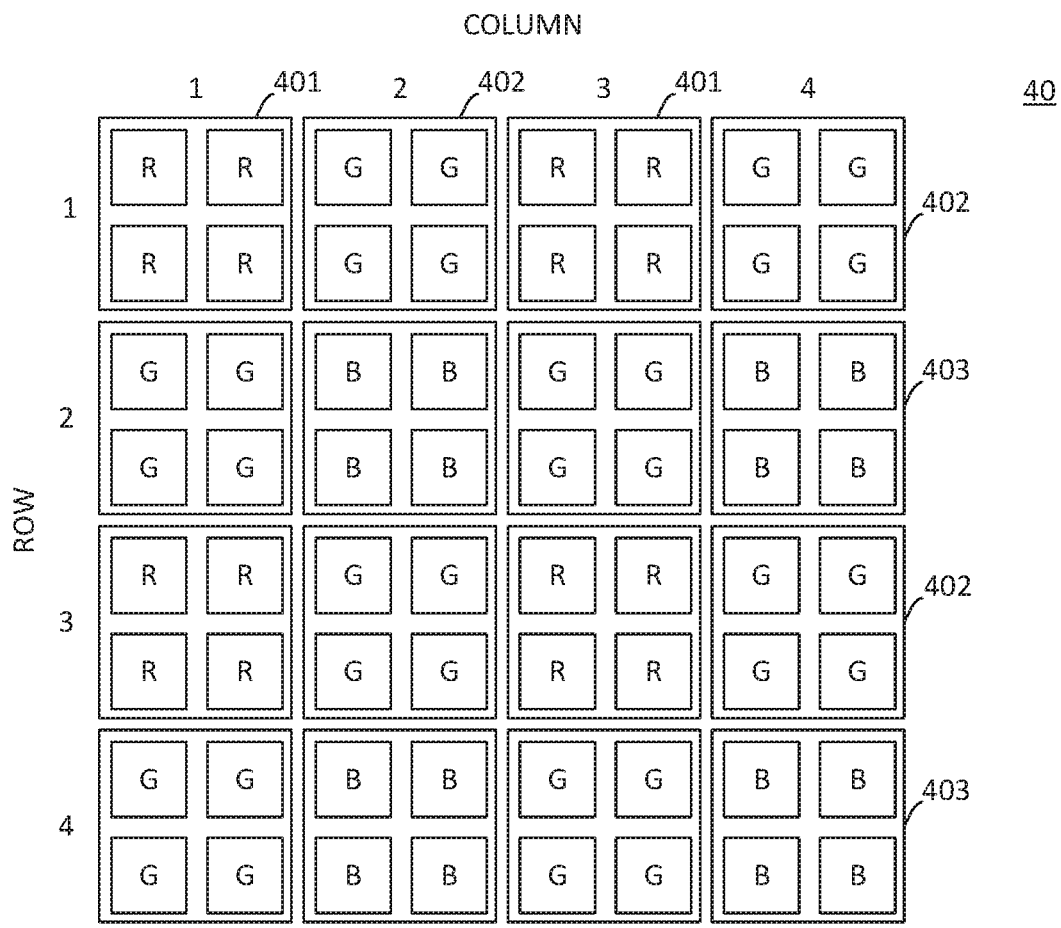
FIG. 4 is a diagram illustrating a color filter array of a quad Bayer color pattern for an image sensor according to an embodiment of the present disclosure.

FIG. 4 is a diagram illustrating a color filter array 40 illustrating a quad Bayer color pattern for an image sensor according to an embodiment of the present disclosure. Referring to FIG. 4, color filter array 40 includes a plurality of color filter clusters (401, 402, 403) disposed over a pixel array including a plurality of pixels arranged in rows and columns. In one embodiment, each color filter cluster includes a group of same color filters. In the example shown, a color filter cluster 401 includes four red color filters R, a color filter cluster 402 includes four green color filters G, and a color filter cluster 403 includes four blue color filters B. In the embodiment, the quad Bayer color pattern includes two Red color filter clusters and two Green color filter clusters alternatively arranged in a first row, two Green color filter clusters and two Blue color filter clusters alternatively arranged in a second row. This pattern repeats in color filter array 40, such that the number of Green color filter clusters is twice (2 times) the number of Blue color filter clusters and the number of Red color filter clusters. In other words, the number of Green color filter clusters represents 50 percent of the total color filter clusters in the color filter array whereas the number of the Red color filter clusters and the number of Red color filter clusters each represent 25 percent of the total color filter clusters in the color filter array.

An image sensor may perform pixel binning by concurrently reading out pixel signals of pixels arranged in a same color filter cluster. The timing diagram of concurrently reading out the pixels of an image sensor is shown in FIG. 3B.

Figure 5:
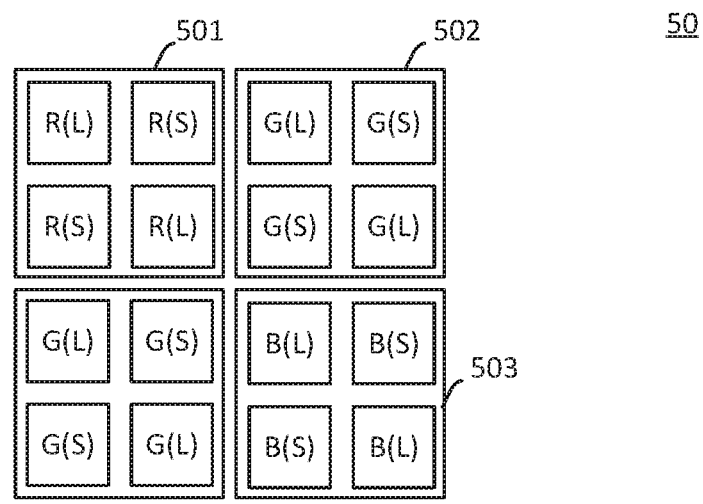
FIG. 5 is a diagram of a color filter array 50 illustrating a concept of HDR using different exposure times according to an embodiment of the present invention.

FIG. 5 is a diagram of a color filter array 50 illustrating a concept of HDR using different exposure times according to an embodiment of the present invention. Referring to FIG. 5, color filter array 50 includes a first color filter cluster 501 having a plurality of red color filters and respective pixels having different exposure times, a second color filter cluster 502 having a plurality of green color filters and respective pixels having different exposure times, and a third color filter cluster 503 having a plurality of blue color filters and respective pixels having different exposure times. In one embodiment, pixels respective to the first, second, and third color filter clusters may have a first exposure time L and a second exposure time S, which is shorter than the first exposure time L. In the example shown in FIG. 5, four pixels and two exposure times are used in each color filter cluster. But it is understood that the number is arbitrarily chosen for describing the example embodiment and should not be limiting. For example, the number of pixels can be any even integer number (e.g., 6, 8, 10), and the number of exposure times can be any integer, e.g., 3 or 4.

Referring to FIG. 5, the pixels associated with the red color filter cluster and having a long exposure time are denoted with R(L) and the pixels associated with the red color filter cluster and having a short exposure time are denoted R(S). Similarly, the pixels associated with the green color filter cluster and having a long exposure time are denoted with G(L) and the pixels associated with the green color filter cluster and having a short exposure time are denoted G(S). The pixels associated with the blue color filter cluster and having a long exposure time are denoted with B(L) and the pixels associated with the blue color filter cluster and having a short exposure time are denoted B(S).

Figure 6:
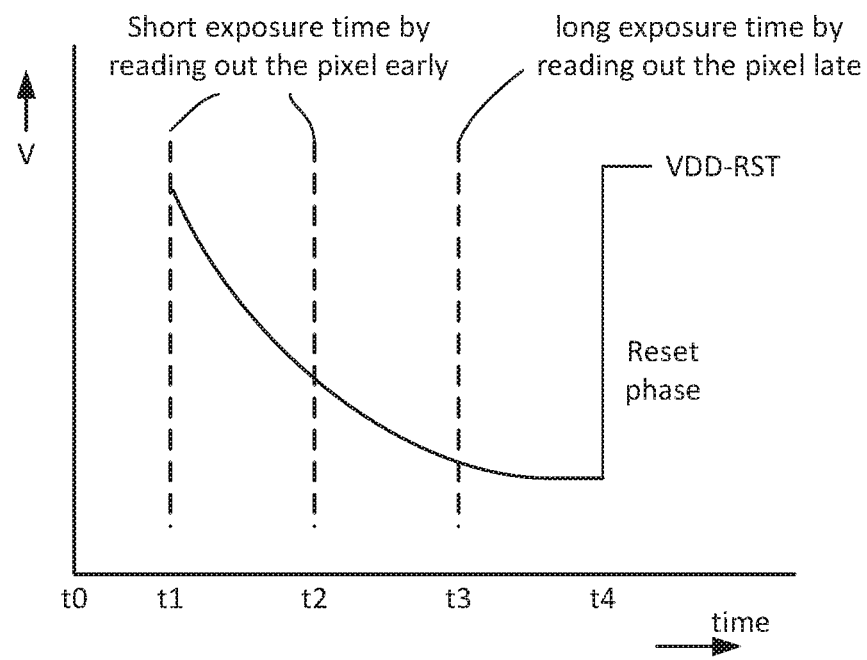
FIG. 6 is a graph diagram illustrating an operation for providing different exposure times to the pixels of FIG. 5 according to an embodiment of the present disclosure.

FIG. 6 is a graph diagram illustrating an operation for providing different exposure times to the pixels of FIG. 5 according to an embodiment of the present disclosure. For example, a pixel can be read out in a multitude of phases: a reset phase, an electron transfer phase, and a readout phase. During the reset phase, the photodiode PD is charged to the reset voltage VDD-RST level by the reset transistor RST. During the integration phase, the photodiode PD is exposed to a light source for receiving photons. The photons cause a charge to leak through the photodiode PD, and the remaining charge is proportional to the number of the photons that strike the photodiode PD, i.e., during the integration phase, the voltage level of the gate of the source follower SF will drop as a function of the number of received photons or light source intensity. By varying the readout timing (i.e., timing for activating the transfer transistor TX), the pixel can have short exposure times t2 or long exposure time t3 as shown in FIG. 6. It is noted that the different exposure times overlap. The sum of the charge of the pixels is provided to the floating diffusion node FD and read out by activating the row select transistor SEL.

Conventional approaches of obtaining high dynamic ranges utilize difference conversion gains for different illumination levels. For example, a low conversion gain is used to achieve wide dynamic range under bright light condition, but the low conversion gain results in an increase of readout noise. Therefore, a high conversion gain is used to lower readout noise under low light condition. Accordingly, conventional approaches utilize different conversion gains to solve the problems of improving dynamic ranges without increasing readout noise. For example, conventional approaches utilize a low conversion gain at high illumination levels and a high conversion gain at low light levels. In contrast, in accordance with embodiments of the present disclosure, pixels are binned together according to a pattern of a Bayer filter array having a plurality of color filter clusters, and a subset of the pixels associated with a color filter cluster may have different exposure times. The purpose of grouping subsets of pixels having different exposure times is to achieve higher dynamic range. Long exposure times can accurately measure low light levels with reduced readout noise in electrons. Short exposure times can accurately measure high illumination levels without saturating pixels. In this way, a greater dynamic range linear measurement of high light intensity can be obtained.

In one embodiment, pixels having a same exposure time associated with a color filter cluster having same color filters are binned together and read out for a common ADC measurement. Referring to FIG. 5, pixels associated with a long exposure time (e.g., two pixels R(L) arranged diagonally in red color clusters 501) are binned together and provided to a common ADC for obtaining first digital data. Thereafter, pixels associated with a short exposure time (e.g., two pixels R(S) arranged diagonally in red color clusters 501) are binned together and provided by readout circuitry to the common ADC for obtaining second digital data. The first and second digital data are stored in a data storage and summed together to provide an average data for display on a display device.

Accordingly, embodiments of the present disclosure provide an image sensor. The image sensor includes a pixel array having a plurality of pixels, a color filter array having a plurality of color filter clusters overlying the pixels, and readout circuitry configured to concurrently provide pixels sharing a color filter cluster and having a same exposure time to an ADC for data conversion. For example, the color filter array may be the quad Bayer color filter array of FIG. 4 and FIG. 5. The pixels sharing a same color filter cluster and having the same exposure time may be pixels associated with pixels with a long exposure time or a short exposure time in any one of the color filter clusters 501 to 503.

In one embodiment, in a first time interval, pixels of a first exposure time (long or short exposure time) in color filter clusters 501 and 502 on a same row are binned together, and first binned charges of color filter clusters 501 and 502 are measured by respective first ADC and second ADC (not shown) to obtain respective first digital data, which are stored in a data storage. In a second time interval different from the first time interval, pixels of a second exposure time different from the first exposure time in color filter clusters 501 and 502 on the same row are binned together, and second binned charged of color filter clusters 501 and 502 are measured by the first ADC and second ADC, respectively, to obtain respective second digital data, which are stored in a data storage. The first and second digital data stored in the data storage can then be summed together with a high dynamic range and readout noise for display.

It is noted that FIG. 5 illustrates an exemplary embodiment. One of ordinary skill in the art would recognize many variations, alternatives, and modifications. For example, the exemplary color filter array and the associated pixel layout may have a 3×2 or 4×2 group, where three subsets or four subsets of two pixels in a color filter cluster can have three or four different exposure times, respectively.

Embodiment 2

This exemplary embodiment involves normal exposure time control, but where binning is desired since the resolution is either not needed, not a priority, or some areas of the sensor have such low light that lower read noise is called for. In a binning mode, the combined sum of four photodiodes would ideally be able to read out in one operation. However, the large number of maximum electrons imply that this may not be possible with the allowed voltage swing at the pixel floating diffusion or source follower output. This can sometimes be managed by introducing an additional transistor or circuit elements to provide the option for a programmable lower conversion gain when binned pixel readout is desirable. But this comes at the cost of additional area which is at a premium in small pixel layout and increased circuit noise, when referred to electron count. By reading out only two pixels at a time, the need for dual conversion gain can be reduced, and more benefit from circuit noise reduction can be obtained. For example, if a conversion gain of half the regular conversion gain needs to be introduced in order to read out four full photodiodes, a reduction in circuit read noise of a factor of 2 in voltage for a binned pixel readout can be obtained compared to 4 individual pixel readouts (2=sqrt(4)), but no benefit is obtained when referred to electrons due to loss of conversion gain. The embodiment uses the normal conversion gain with binning only 2 pixels at one time, then a sqrt(2) improvement in noise in both voltage and electrons can be achieved. And in this embodiment, since a conversion gain reduction by 2× for 4 full photodiode readout is needed, two full photodiode readouts with a regular conversion gain can be obtained.

In one embodiment, a set of pixels associated with a same color filter cluster are binned to a plurality of subsets, and the summed charge of each subset is then readout and measured by an ADC. Referring to FIG. 2 and FIG. 4, in a first time interval, two upper pixels associated with red color filter cluster 401 on row 1 are binned together, the charges of these two upper pixels are binned or summed in a first floating diffusion node (through the activation of respective transfer transistors) and provided by readout circuitry to a first ADC through a first readout line, as shown in FIG. 2. And the two upper pixels associated with green color filter cluster 402 on row 1 are binned together, the charges of these two upper pixels are summed in a second floating diffusion node (through the activation of respective transfer transistors) and provided by readout circuitry to a second ADC through a second readout line. Thereafter, in a second time interval, the two lower pixels associated with red color filter cluster 401 on row 1 are binned together, the charges of these two upper pixels are summed in the first floating diffusion node (through the activation of respective transfer transistors) and provided by readout circuitry to the first ADC through the first readout line. And the two lower pixels associated with green color filter cluster 402 on row 1 are binned together, the charges of these two lower pixels are summed in the second floating diffusion node (through the activation of respective transfer transistors) and provided by readout circuitry to the second ADC through the second readout line. Accordingly, pixel signals of the total number of pixels associated with a same color filter cluster are read out twice using a reduced conversion gain, which is half of a conventional conversion gain required for concurrently reading out pixel signals of all of the pixels associated with the same color filter cluster. Of course, many alternatives and variations are possible.

For example, in another embodiment, referring to FIG. 4, two pixels associated with red color filter cluster 401 on the left side of the same column (e.g., column 1) are binned together, the charges of these two left-side pixels are binned in the first floating diffusion node (through the activation of respective transfer transistors) and provided by the readout circuitry to the first ADC through the first readout line, as shown in FIG. 2. And the two pixels associated with green color filter cluster 402 on the left side of the same column (e.g., column 2) are binned together, the charges of these two left-side pixels are summed in the second floating diffusion node (through the activation of respective transfer transistors) and provided by the readout circuitry to the second ADC through the second readout line. Thereafter, in a second time interval, the two right-side pixels associated with red color filter cluster 401 in column 1 are binned together, the charges of these two right-side pixels are summed in the first floating diffusion node (through the activation of respective transfer transistors) and provided by the readout circuitry to the first ADC through the first readout line. And the two right-side pixels associated with green color filter cluster 402 in column 1 are binned together, the charges of these two right-side pixels are summed in the second floating diffusion node (through the activation of respective transfer transistors) and provided by the readout circuitry to the second ADC through the second readout line. One of ordinary skill in the art would recognize many variations, modifications, and alternatives for the readout sequence.

According to some embodiments of the present disclosure, an image sensor may include a pixel array having a plurality of pixels, and a color filter array having a plurality of color filter clusters overlying the pixel array. Each of the color filter clusters includes a number of same color filters overlying a respective number of pixels. The image sensor also includes readout circuitry configured to bin (sum) pixel signals of half the number of pixels underlying a color filter cluster using a regular conversion gain, and read out the total number of pixels in two readouts to achieve a sqrt(2) improvement in readout noise in both voltage and electrons.

Embodiment 3

This embodiment involves cases where shared pixels include multiple colors, but not quad Bayer color patterns. Colors may be mixed on an individual basis, such as RWRW. In this case, all the red pixels are read out at one time, or all white pixels are read out at one time, but not mixing colors in the same readout. In this case, the normal benefit of binned pixel readout can be obtained when the standard scheme is not supported by the color arrangement.

Figure 7:
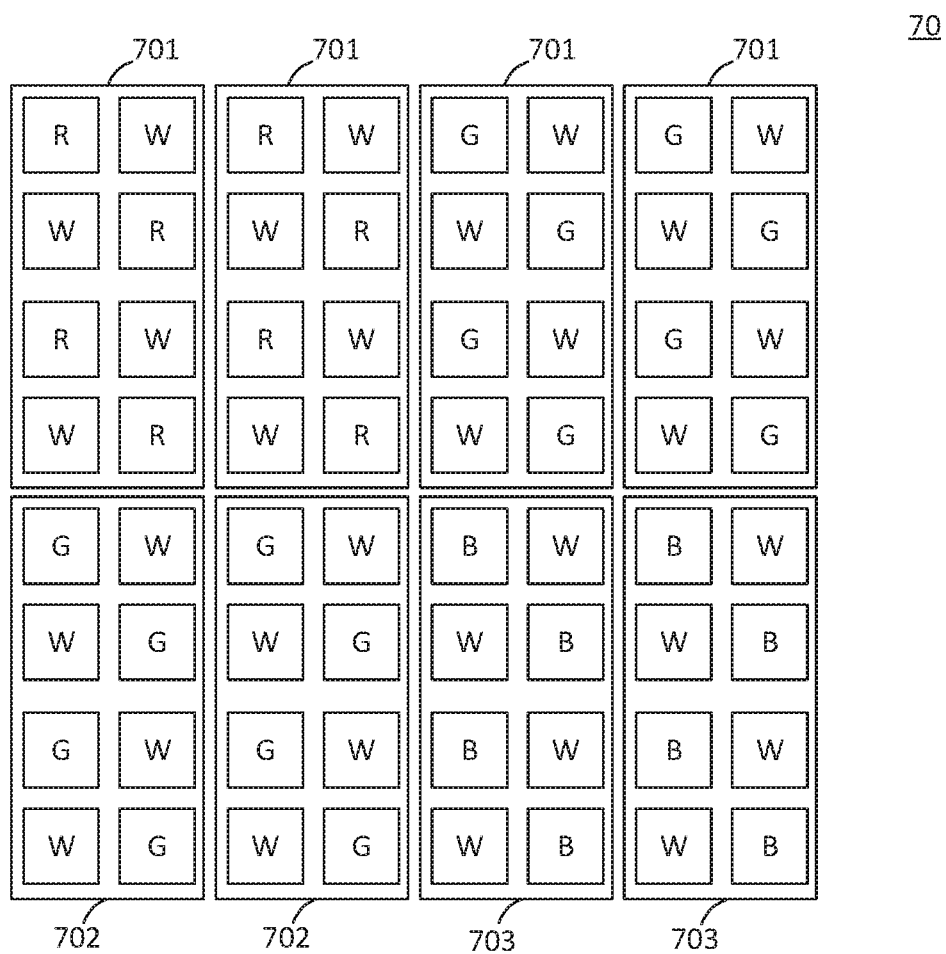
FIG. 7 is a block diagram illustrating a color filter array of an advanced color pattern according to an embodiment of the present invention.

FIG. 7 is a block diagram illustrating a color filter array 70 of an advanced color pattern according to an embodiment of the present invention. Referring to FIG. 7, color filter array 70 includes a plurality of color filters R, G, B and luminance filter W. Color filters R, G, B are associated with respective color pixels, and the luminance filter W is associated with white pixels. As used herein, the color filter R passes through a red light wavelength (or a red component), the color filter G passes through a green light wavelength (or a green component), the color filter B passes through a blue light wavelength (or a blue component), and the luminance filter W passes through visible light wavelengths (or white light).

It is noted that color filter array 70 is not a quad Bayer color filter array, which has a conventional color pattern of (RGRG . . . ), (GBGB . . . ), (RGRG . . . ), as shown in FIG. 4. In one embodiment, filters of color filter array 70 are arranged row-wise in the following pattern: (RWRWGWGW . . . ), (WRWRWRWGWG . . . ), (RWRWGWGW . . . ), (WRWRWRWGWG . . . ), (GWGWBWBW . . . ), (WGWGWBWB . . . ), (GWGWBWBW . . . ), (WGWGWBWB . . . ), (RWRWGWGW . . . ), (WRWRWRWGWG . . . ), In the example shown, the ratio of the number of white pixels to other color pixels R, G, B is 1:1. However, it is understood that the ratio is arbitrary chosen for describing the example embodiment and should not be limiting. For example, the ratio can be 2:1 or 1:2 or other fraction or percentage.

In an aspect of the present disclosure, an image sensor includes a pixel array having a plurality of pixels and a color filter array including a plurality of filter clusters overlying the pixel array. For example, color filter array 70 includes first filter clusters 701, second filter clusters 702, and third filter clusters 703. Each of first filter clusters 701 includes a first number of red color filters R and a second number of luminance filters W. Each of second filter clusters 702 includes a third number of green color filters G and the second number of luminance filters W, and each of third filter clusters 703 includes a fourth number of blue color filters B and the second number of luminance filters W. In one embodiment, readout circuitry concurrently provides pixel signals of pixels associated with same filters in a filter cluster to a readout line for data conversion in a same time interval, but the readout circuitry does not concurrently provide pixel signals of pixels associated with different filters in a same filter cluster to the readout line. For example, the readout circuitry provides the binned pixel signals of pixels associated with the red color filters R in filter cluster 701 to the readout line for data conversion in a first time interval, and the binned pixel signals of pixels associated with the luminance filters W in filter cluster 701 to the readout line in a second time interval different from the first time interval.

In one embodiment, each filter cluster has a same number of color filters and luminance filters, i.e., the ratio of the color filters to the luminance filters is 1:1. In one embodiment, the color filters and the luminance filters are arranged in a checkerboard pattern. In one embodiment, the color filters includes red color filters, green color filters, and blue color filters.

Figure 8:
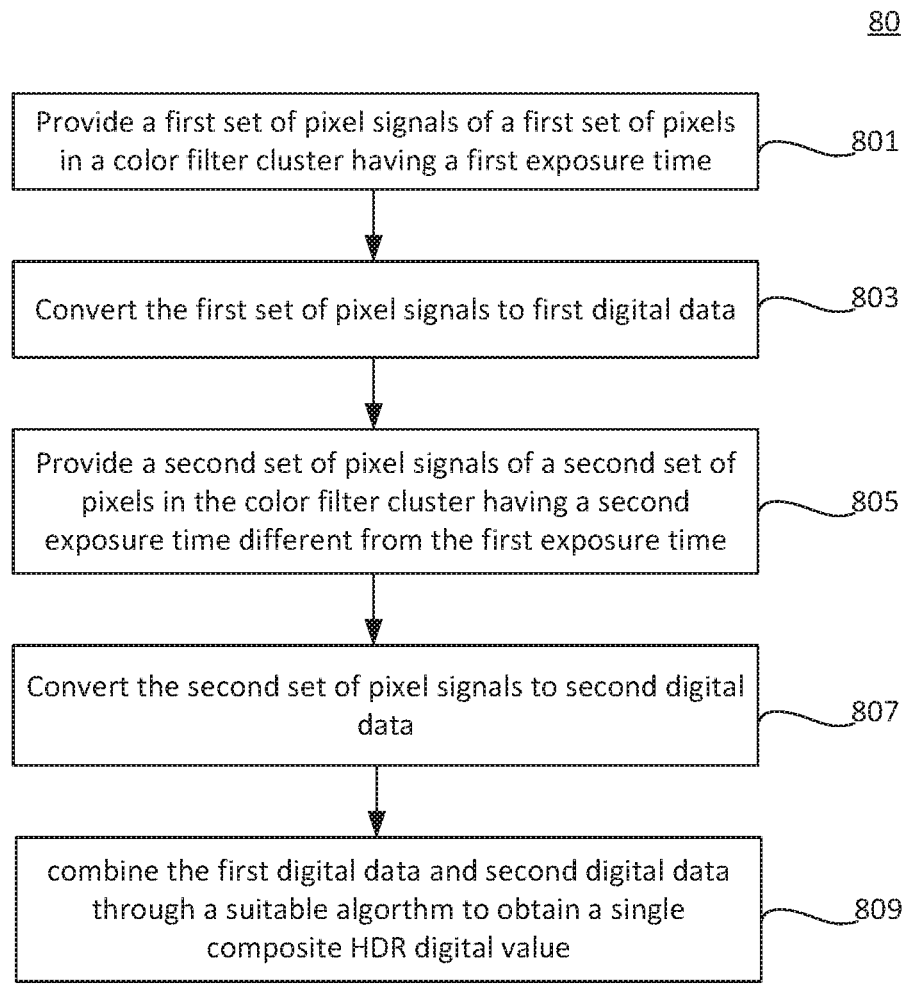
FIG. 8 is a simplified flowchart illustrating a method of binning pixels in an image sensor having real time HDR according to an embodiment of the present invention.

FIG. 8 is a simplified flowchart illustrating a method 80 of binning pixels in an image sensor having real time HDR according to an embodiment of the present invention. Method 80 is described with reference to FIG. 5 with an image sensor having a color filter array, which includes a plurality of color filter clusters (501, 502, 503) having a plurality of color filters and respective pixels having different exposure times (R(L), R(S), G(L), G(S), B(L), B(S)). In block 801, a first set of pixel signals of a first set of pixels in a color filter cluster having a first exposure time are binned together and provided to a readout line for data conversion. In block 803, the first set of pixel signals are converted by an analog-to-digital converter (ADC) to first digital data representative of the first set of pixel signals. In block 805, a second set of pixel signals of the first set of pixels in the color filter cluster having a second exposure time different from the first exposure time are binned together and provided to the readout line for data conversion. In block 807, the second set of pixel signals are converted by the ADC to second digital data representative of the second set of pixel signals. In block 809, the first digital data and the second digital data are summed together to provide an average data value. Referring to FIG. 5, in one embodiment, the first set of pixel signals of pixels R(S) in red color filter 501 are binned and provided to the readout line connected to the ADC, which converts the first set of pixel signals to first digital data. Thereafter, the second set of pixel signals of pixels R(L) in red color filter 501 are binned and provided to the readout line connected to the ADC, which converts the second set of pixel signals to second digital data. The first and second digital data may be combined through an appropriate algorithm to obtain a composite HDR pixel data value. It is noted that the first set may be the pixels with a long exposure time, and the second set may be pixels with a short exposure time. In one embodiment, pixels having a first exposure time and pixels having a second exposure time are diagonally arranged in the first pixels set. By exposing pixels with different exposure times in a color filter cluster and binning pixels having a same exposure time in the color filter cluster and measuring the binned charge by a common ADC, a real time HDR can be achieved.

Figure 9:
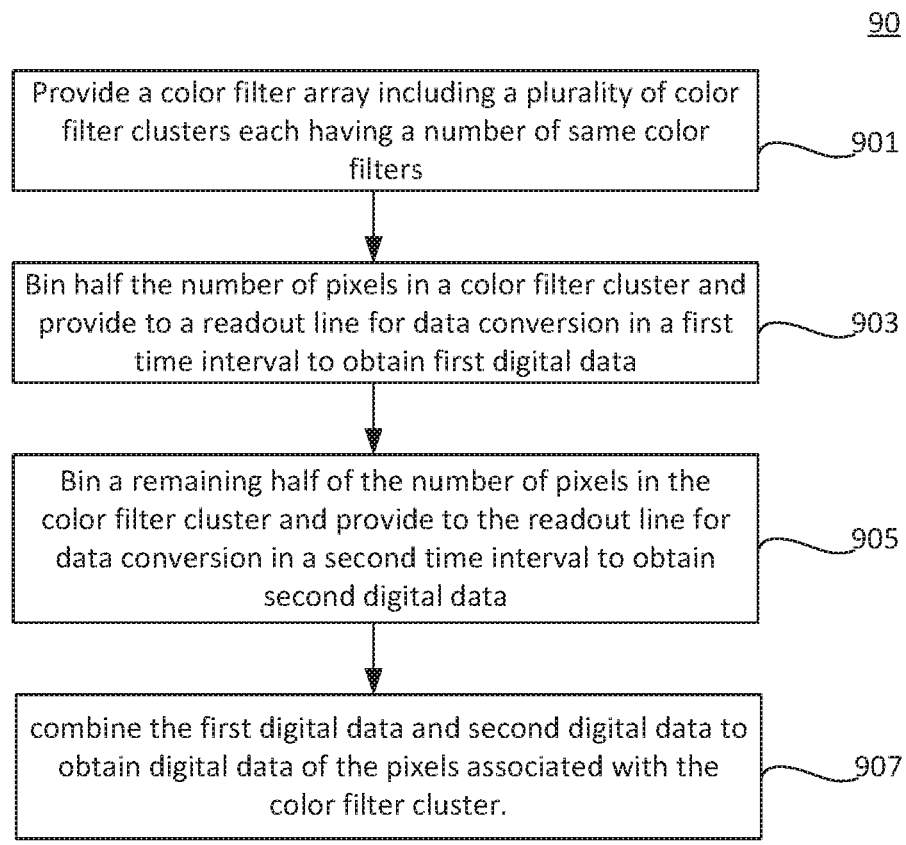
FIG. 9 is a simplified flowchart illustrating a method of binning pixels for obtaining reduced readout noise according an embodiment of the present invention.

Embodiments of the present disclosure also provide a method of binning pixels in an image sensor for obtaining reduced readout noise using a normal or conventional conversion gain. FIG. 9 is a simplified flowchart illustrating a method 90 of binning pixels for obtaining reduced readout noise according an embodiment of the present invention. Method 90 includes providing a color filter array comprising a plurality of color filter clusters overlying a plurality of pixels at block 901. The color filter clusters each include a number of same color filters. Referring to FIG. 4, the color filter array includes a plurality of color filter clusters (401, 402, 403), each of the color filter clusters includes a number of same color filters. For example, color cluster 601 has 4 red color filters. Method 90 also includes binning half the number of pixels in a color filter cluster and providing the binned half the number of pixels to a readout line in a first time interval for data conversion to obtain first digital data representative of the pixel signals associated with the half the number of pixels in block 903. Method 90 further includes binning a remaining half the number of pixels in the color filter cluster and providing the binned remaining half the number of pixels to the readout line in a second time interval different from the first time interval for data conversion to obtain second digital data representative of the pixel signals associated with the remaining half of the number of pixels in the color filter cluster in block 905. The half the number of pixels in the color filter cluster may be horizontally binned or vertically binned. In block 907, the first digital data and second digital data are combined to obtain digital data associated with the pixels of the color filter cluster. By binning half the number of pixels for data conversion and performing two readouts using a conventional conversion gain, a reduction of readout noise is achieved.

Figure 10:
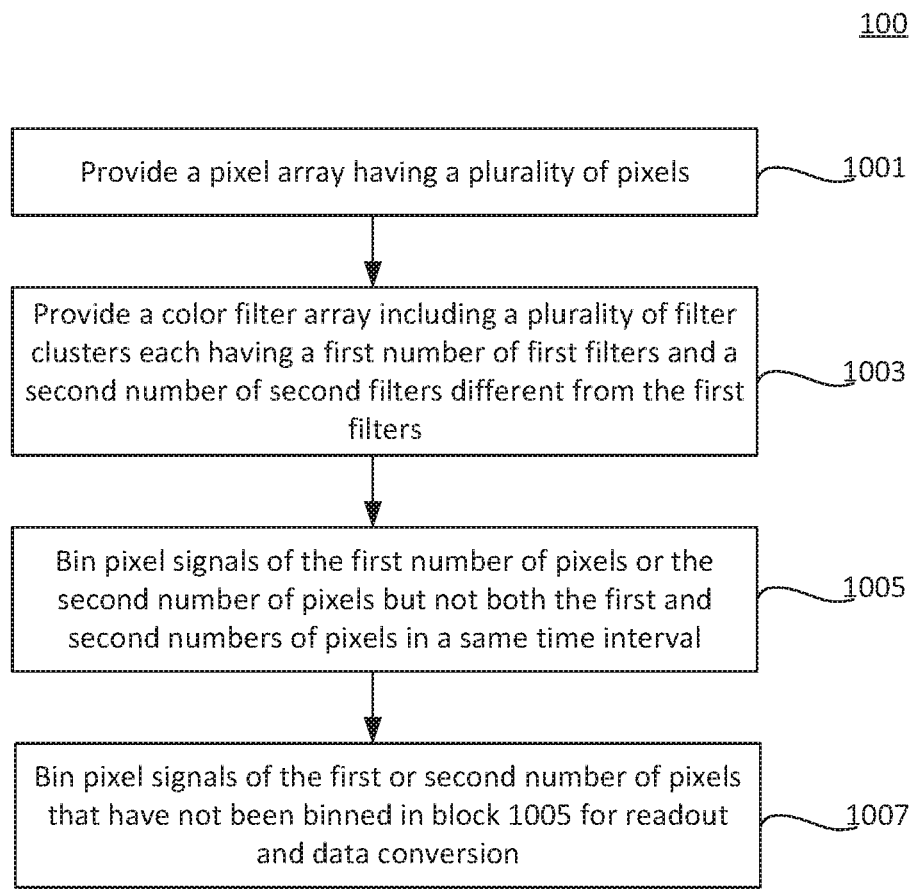
FIG. 10 is a simplified flowchart illustrating a method 100 of binning pixels in an image sensor having a color filter array with non-Bayer color pattern according an embodiment of the present invention.

FIG. 10 is a simplified flowchart illustrating a method 100 of binning pixels in an image sensor having a color filter array with non-Bayer color pattern according an embodiment of the present invention. Method 100 includes providing a pixel array having a plurality of pixels in block 1001, and providing a color filter array having a plurality of filter clusters overlying the pixel array in block 1003. The filter clusters each include a first number of first filters overlying a respective first number of pixels and a second number of second filters overlying a respective second number of pixels. In block 1005, method 100 includes binning pixel signals of the first number of pixels or the second number of pixels in a filter cluster in a same time interval, but not both the first number of pixels and the second number of pixels in the filter cluster in the same time interval. In block 1007, method 1007 further includes binning pixel signals of the first or second number of pixels that have not been binned in block 1005 for readout. In one embodiment, the color filter array may be the one shown in FIG. 7, the filter clusters may be one of the clusters 701, 702, and 703, the first filters may be red, green, or blue color filters, and the second filters may be luminance filters passing through white light.

It is to be understood that the appended claims are not limited to the precise configuration illustrated in the drawings. One of ordinary skill in the art would recognize various modification, alternatives, and variations may be made in the arrangement and steps of the methods and devices described above without departing from the scope of the invention.

What is claimed is:

1. An image sensor comprising:
a pixel array comprising a plurality of pixels;
a color filter array comprising a plurality of color filter clusters disposed over the pixel array, each of the color filter clusters comprising a group of N same color filters, wherein N is an integer greater than 1 and pixels of each color filter cluster have at least two different exposure times; and
readout circuitry configured, for each color filter cluster, in each of a plurality of readout time intervals, to concurrently provide a respective subset of the pixels of the color filter cluster having a respective one or more of the different exposure times to a readout line for digital data conversion, each respective subset of the pixels of the color filter cluster having more than 1 and fewer than N of the pixels of the color filter cluster.

2. The image sensor of claim 1, wherein the color filter clusters each comprise four same color filters arranged in squares.

3. The image sensor of claim 1, wherein the color filter array comprises 50 percent green color filter clusters, 25 percent read color filter clusters, and 25 percent blue color filter clusters.

4. The image sensor of claim 1, wherein pixels disposed diagonally with respect to a horizontal or vertical direction have a same exposure time.

5. The image sensor of claim 1, further comprising a plurality of analog-to-digital converters (ADCs) coupled to the readout circuitry, each of the ADCs being configured to convert pixel signals of pixels sharing a common filter cluster and having a first exposure time to first digital data and sequentially convert pixel signals of pixels sharing the common filter cluster and having a second exposure time different from the first exposure time to second digital data.

6. The image sensor of claim 5, further comprising a data storage configured to store the first digital data and the second digital data.

7. The image sensor of claim 1, wherein the different exposure times overlap.

8. The image sensor of claim 1, wherein each color filter cluster is a single rectangular arrangement of pixels.

9. A method for binning pixels in an image sensor having a color filter array comprising a plurality of color filter clusters disposed over a pixel array, each of the color filter clusters comprising a group of N same color filters, wherein N is an integer greater than 1 and pixels of each color filter cluster have at least two different exposure times, the method comprising, for each color filter cluster:
providing, by readout circuitry, a first set of pixel signals of a first set of pixels in the color filter cluster having a first one or more of the different exposure times to a readout line by readout circuitry, the first set of pixels being more than 1 and fewer than N of the pixels of the color filter cluster;
converting the first set of pixel signals to first digital data;

providing, by the readout circuitry, a second set of pixel signals of a second set of pixels in the color filter cluster having a second one or more of the different exposure times to the readout line by the readout circuitry, the second one or more of the different exposure times being different from the first exposure time, the second set of pixels being more than 1 and fewer than N of the pixels of the color filter cluster;

converting the second set of pixel signals to second digital data; and combining the first and second digital data through a suitable algorithm to obtain a single composite HDR digital value.

10. The method of claim 9, wherein converting the first set of pixel signals and the second set of pixel signals are sequentially performed by a same analog-to-digital converter.

* * * * *